Sept. 5, 1939.  C. V. ROHRBACHER  2,172,332
METHOD OF PRESERVING CELERY
Filed Oct. 21, 1936
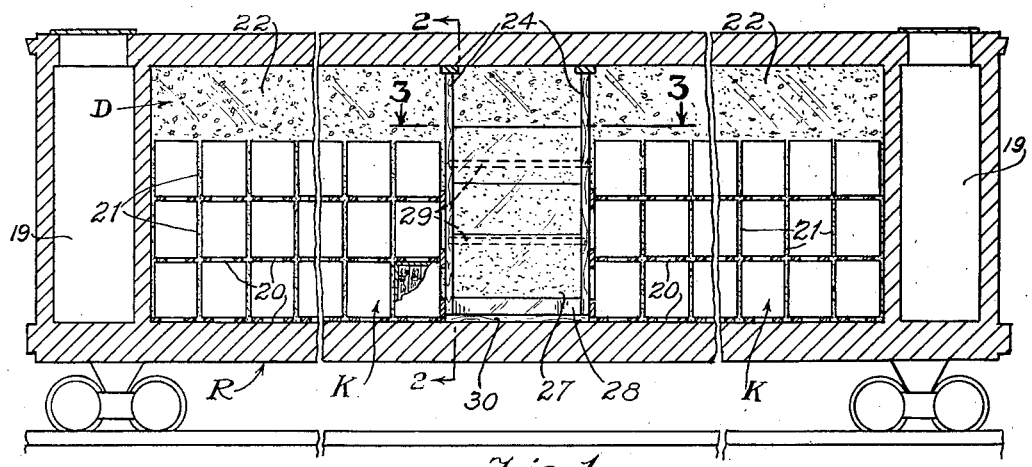
Fig. 1.
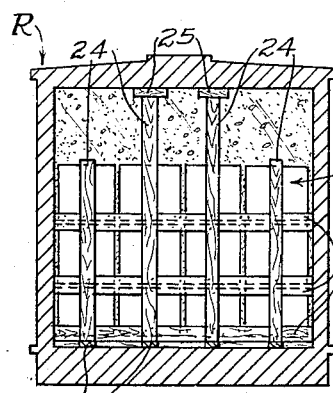
Fig. 2.
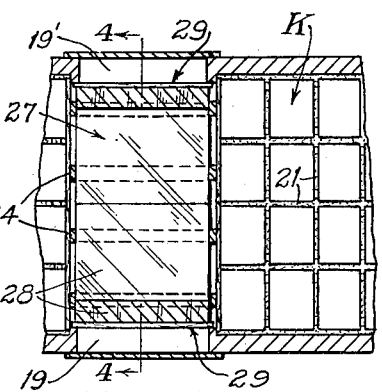
Fig. 3.
Fig. 5.
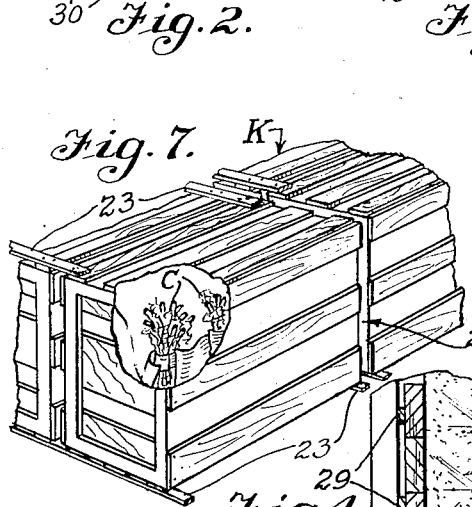
Fig. 7.
Fig. 4.
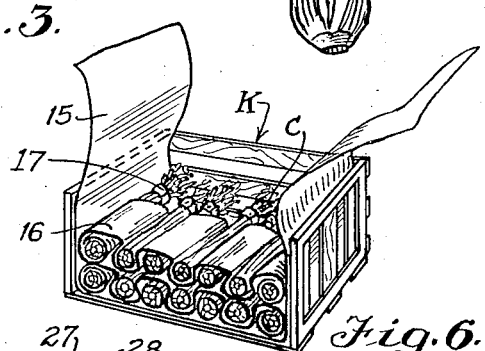
Fig. 6.
Clarence V. Rohrbacher
INVENTOR
BY Edwin D. Jones
ATTORNEY Patented Sept. 5, 1939

2,172,332

UNITED STATES PATENT OFFICE 2,172,332

METHOD OF PRESERVING CELERY

Clarence V. Rohrbacher, Los Angeles, Calif., assignor to H. L. Rohrbacher, Los Angeles County, Calif.

Application October 21, 1936, Serial No. 106,834

4 Claims. (Cl. 62—15)

My invention relates to and has for a purpose the provision of a method of preserving celery and similar perishable produce, during shipment in freight cars or the like, and which method is characterized by the complete preservation of the celery against decomposition by reason of bruising or other physical damage prior to, during and subsequent to shipment, or decomposition by reason of high temperatures and lack of moisture, and spreading of disease should any of the celery stalks be infected.

It is also a purpose of my invention to provide a method and means of packing celery in crates whereby each individual stalk is yieldingly supported or cushioned in a crate to prevent injury thereto during handling of the crate or during transit thereof in a car or truck.

A further purpose of my invention resides in the provision of a device for holding the several branches of an individual celery stalk in contiguous relationship to each other to prevent tearing of the branches from each other during handling, and to preclude water in an excess amount reaching the inner or heart branches thereof and causing decomposition.

I will describe only one method of preserving celery in crates, and one branch-holding device for celery stalks, each embodying my invention, and will then point out the novel features thereof in claims.

In the accompanying drawing:

Fig. 1 is a view showing semi-diagrammatically and in longitudinal section a freight car embodying one method of preserving celery.

Fig. 2 is a vertical transverse sectional view taken on the line 2—2 of Fig. 1 and looking in the direction of the arrows.

Fig. 3 is a fragmentary horizontal sectional view taken on the line 3—3 of Fig. 1.

Fig. 4 is a transverse sectional view taken on the line 4—4 of Fig. 3 with the crate bracing structure omitted.

Fig. 5 is an enlarged detail perspective view of a stalk of celery having applied thereto one form of branch-holding device embodying my invention.

Fig. 6 is a detail perspective view of one of the crates shown in Fig. 1 illustrating one method of packing celery therein embodying my invention.

Fig. 7 is a fragmentary perspective view of two adjacent crates and the manner in which the spacing strips are secured thereto.

In carrying out my invention, I provide a wooden crate K in which stalks of celery C are adapted to be packed while the crate is reposing on its side with the slats forming the top of the crate not yet applied, as shown in Fig. 6. As here shown, the crate is without slats at the bottom and one side merely for the purpose of revealing how the celery stalks are packed in the crate, it being understood that in practice the bottom slats but not the side slats are in place when packing the crate.

Prior to introducing any of the stalks into the crate, a sheet 15 of waxed paper, or any other flexible and water-proof material, is laid in what is now the bottom of the crate, then extended up the sides thereof and its ends temporarily swung to an unobstructing position over the crate ends.

The celery is packed in the crate in horizontal rows one above the other with the stalks of each row extending transversely of the crate and so that when the crate is turned to upright position the leaf ends of each stalk will be uppermost, as shown in Fig. 7. As each row of stalks is packed in the same manner, a description of one will suffice for all.

As shown in Fig. 6, one endmost stalk of a row is wrapped in the end portion of a sheet 16 of waxed paper similar to the sheet 15. The next stalk is laid on the extended part of the sheet 16 and pushed laterally against the first stalk to form an abrupt bend in the sheet. The third stalk is laid beneath the sheet 16 on the sheet 15 and then pushed against the second stalk to again form an abrupt bend in the sheet 16. With this method of packing continued throughout the row, that is, adjacent stalks arranged on opposite sides of the sheet 16, the free end of the sheet 16 is wrapped about the last stalk of the row.

When the crate has been completely packed in the manner described, the extended ends of the sheet 15 are overlapped to cover the stalks of the topmost row, when the crate can be closed by nailing on the slats forming the side of the crate.

Manifestly, by my method of packing celery in a crate, each individual stalk is enclosed in a wrapping of paper in a manner to cushion that stalk in its movement with relation to an adjacent stalk or to the walls of the crate. Thus, not only is each stalk protected against being bruised, crushed or otherwise damaged during handling prior and subsequent to shipment, but such individual wrapping rapidly promotes bleaching of the stalks so that when shipped green they will arrive at a destination bleached white.

As shown in Fig. 5, each individual celery stalk is severed at its leaf ends to remove the extremities of its branches so that the capillary tubes will be exposed for a purpose to be described hereinafter. By the use of an individual band or binder 17 for each stalk, the celery branches are drawn together and held in such contiguous relationship that they cannot be spread and broken off during handling, particularly when stacked on a vegetable stand where the stalks are subjected to careless handling by customers.

When displayed on a vegetable stand the celery stalks are from time to time sprayed with water to freshen their appearance. If the branches are loose as is the present practice, water collects between the innermost or heart branches causing decomposition. By constricting the branches as described, the possibility is reduced to a minimum of water seeping into and accumulating between the heart branches and decomposing the latter. The individual binder or band is shown in Fig. 5, as comprising a strip of waxed paper, or any water-proof material, wrapped tightly about the stalk with its overlapped ends secured together by a staple 18.

Referring now to Figs. 1 to 4 inclusive, I have here shown a conventional form of freight car R which may or may not be provided with bunkers 19 at its end in which ice is adapted to be stored for cooling the inner front and rear end walls of the car.

It is customary in loading a freight car with celery crates to stack the crates one upon the other from end to end of the car even across the doorways. Such a method of loading is known in the industry as a solid load. Incident to the performance of my method of preserving celery during shipment, the crates are arranged in tiers at opposite sides of the doorways 19' so as to leave that part of the car between the doorways open and free of crates, as shown in Figs. 1 and 2. The crates at either side of the doorways 19 are supported one upon the other to provide intervening bottom chambers or channels 20, while the crates of any vertical row are spaced from the crates of any adjacent row or the walls of the car to provide intervening vertical chambers or channels 21 at both sides and ends of each crate. Further, the crates are stacked to such height in the car as to leave between the uppermost crates and the top wall of the car a chamber or compartment 22 which is coextensive in length with all of the crates and in communication with all of the vertical chambers 21.

As the means for maintaining the crates spaced as described to form the vertical and horizontal chambers is of the same construction for the crates at either side of the doorways, a description of one will suffice for both. As best shown in Fig. 7, spacing strips 23 extend crosswise of and are nailed to the crates as one row is stacked upon another. Thus, the strips space the crates to form the bottom chambers 20 and secure the crates spaced horizontally to form the vertical chambers 21.

To secure the crates against shifting lengthwise of the car as well as relatively to each other and to thereby maintain the space between the doorways free of crates, any suitable means may be provided. As best shown in Fig. 2, four vertical braces 24 are provided, the two inner ones of which extend to the top of the car where transverse blocks 25 are secured to the braces. Between the crates and the vertical braces, horizontal braces 26 extend and are secured by nailing to the vertical braces in such positions as to span the bottom chambers 20 between the outermost crates.

Thus with such bracing structures applied to both groups of crates an intervening space is provided between the two and between the doorways of the car. In this space a well 27 is formed by ice blocks 28, cross braces 29 and supporting beams 30. In the present instance, I employ four or more supporting beams 30 laid across the floor rack of the car between the doorways and to which are nailed the lower ends of the vertical braces 24. Upon these beams blocks of ice are laid horizontally, as best shown in Fig. 4. Across each doorway are extended and secured two or more cross braces 29. Ice blocks are now stacked edgewise on the bottom ice blocks and against the cross braces 29 to span the two doorways and form the U-shaped ice well 27. The top of this well terminates short of the car ceiling so as not to close the confronting ends of the chambers 22.

Pursuant to my method of celery preservation, the crates are loaded into the car with the celery stalks upright and the severed leaf ends uppermost. Once a car has been loaded as described, the bracing structures applied, and the ice well formed between the doorways, finely crushed ice, indicated at D in the drawing, is blown by a conventional ice blower (not shown) into both chambers 22 to fill the latter and also to partly or completely fill the vertical chambers 21 between the crates. This may be effected by first extending the pipe of the blower through either doorway over the top block of ice in that doorway, and then setting the blower into operation. During filling of either chamber 22 by means of long poles (not shown) the fine ice is manually poked downwardly into the vertical chambers 21 so as to fill them as completely as possible.

Once the chambers 21 and 22 have been filled, the ice well 27 is likewise filled with finely crushed ice, and the ice may extend to the ceiling of the car if necessary, as shown in the drawing.

With the car packed with crushed and block ice, as described, and the doors closed, direct refrigeration of the celery is quickly established and maintained for a relatively long period of time. Direct refrigeration is accomplished by employing ice crushed to a degree of fineness which permits of it being blown, poked or otherwise deposited within the vertical chambers between the crates so that the ice is brought into direct contact with the celery stalks with only the paper wrappings as a separating medium. The paper wrappings are so interposed as to prevent excess moisture reaching the stalks, as moisture in quantity sufficient to maintain the celery crisp and tender emanates from the ice above which circulates into the crates to be absorbed by the stalks and particularly by the open ends of the capillary tubes of the stalks.

By provision of the ice well 27 and the crushed ice therein additional refrigeration is provided to insure maintenance of a sufficiently low temperature even when either or both doors of the car are opened for inspection of the celery.

It has been found in practice, that celery packed and refrigerated in accordance with my method, can when green be placed in a car, maintained crisp and tender and free of bruises and disease during transit for a relatively long period of time even under the most adverse temperature conditions, and bleached white during transit and so that when removed from the car at its destination it is perfectly preserved and ready for consumption.

Although I have herein shown only one method of preserving celery in crates, and one branch-holding device for celery stalks, each embodying my invention, it is to be understood that various changes and modifications may be made herein without departing from the spirit of my invention and the spirit and scope of the appended claims.

I claim:

1. A method of preserving celery during shipment in a freight car, which comprises loading the car up to the doorways thereof with crates, having the celery stalks therein with their leaf ends uppermost and the crates spaced from the roof of the car to form horizontal chambers on opposite sides of the doorways; and adjacent crates spaced from each other to form intervening vertical chambers; arranging ice blocks in the car between the doorways to form a storage chamber; and then partly or completely filling all of the chambers with finely divided ice.

2. A method of preserving celery during shipment in a freight car, which comprises loading the car up to the doorways thereof with crates, having the celery stalks therein with their leaf ends uppermost and the crates spaced from the roof of the car to form horizontal chambers on opposites sides of the doorways; and adjacent crates spaced from each other to form intervening vertical chambers; arranging ice blocks in the car between the doorways to form a storage chamber; and then partly or completely filling the chambers above the crates and the vertical chambers between the crates with crushed ice.

3. A method of loading and icing crated green vegetables in a freight car or the like, which comprises stacking and securing the crates in a freight car up to the doorways thereof and so as to be spaced from the roof thereof to form chambers horizontally above the crates; partly or completely filling the chambers with crushed ice; arranging ice blocks in the car between the doorways to form a storage chamber; and then partly or completely filling the storage chamber with crushed ice.

4. A method of loading and icing crated green vegetables in a freight car or the like, which comprises stacking the crates in a car to provide intervening chambers vertically and horizontally between adjacent crates and the storage chambers above the crates communicating with all the vertical chambers; and then packing the vertical and storage chambers with crushed ice.

CLARENCE V. ROHRBACHER.